L. T. ROBINSON.
DEMAND APPARATUS.
APPLICATION FILED MAR. 18, 1913.
1,119,639.
Patented Dec. 1, 1914.
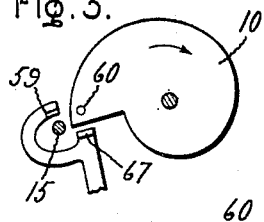
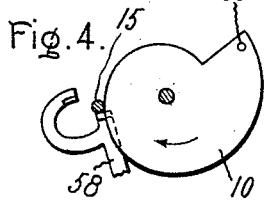
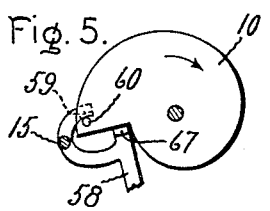
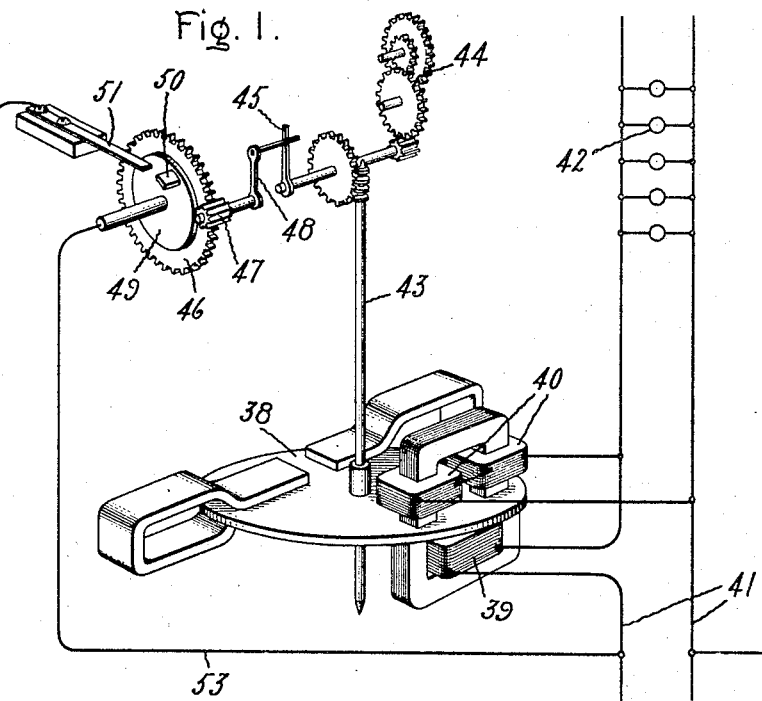
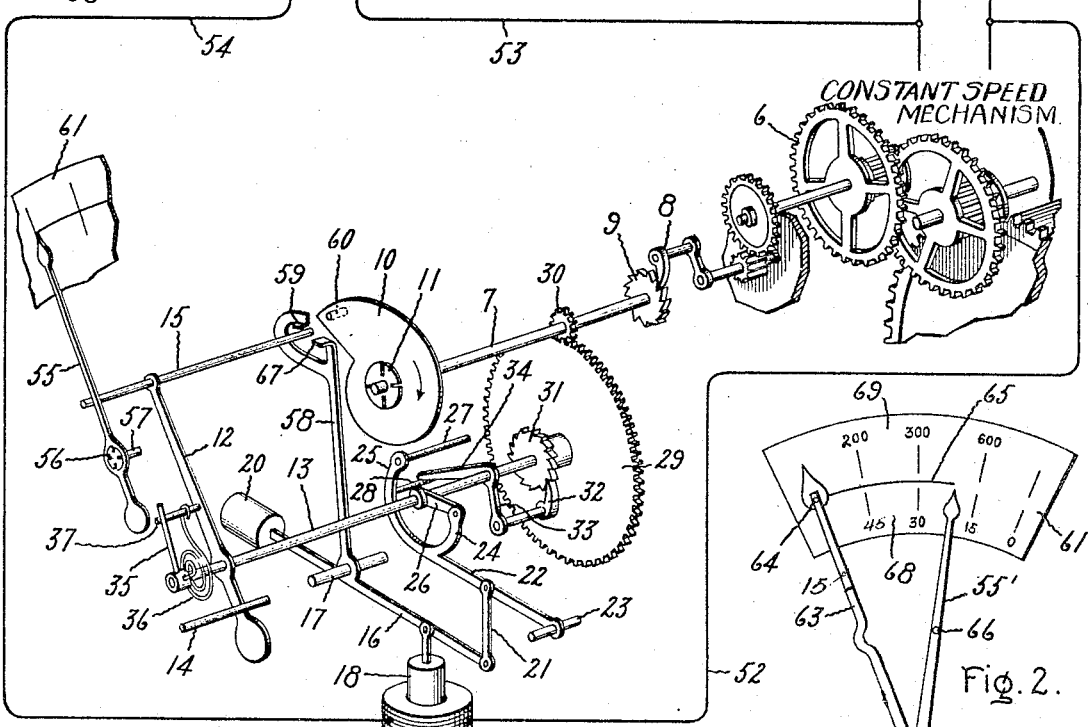
Witnesses:
George W. Tilden
J. Ellis Glen
Inventor:
Lewis T. Robinson,
by Albert G. Davis
His Attorney.

UNITED STATES PATENT OFFICE.

LEWIS T. ROBINSON, OF SCHENECTADY, NEW YORK, ASSIGNOR TO GENERAL ELECTRIC COMPANY, A CORPORATION OF NEW YORK.

DEMAND APPARATUS.

1,119,639.  Specification of Letters Patent.  Patented Dec. 1, 1914.

Application filed March 18, 1913. Serial No. 755,136.

*To all whom it may concern:*

Be it known that I, LEWIS T. ROBINSON, a citizen of the United States, residing at Schenectady, county of Schenectady, State of New York, have invented certain new and useful Improvements in Demand Apparatus, of which the following is a specification.

My invention relates to demand apparatus, and in particular to apparatus which indicate the maximum demand made by an electrical installation upon a central generating station or other source of electric energy supply.

A modern problem of major importance in the distribution of electrical energy to individual consumers is to determine the tariff rate which should be charged each consumer for the energy he uses. One method of determining this tariff rate for electrical energy, which is regarded with considerable favor, consists in charging the consumer at a certain contract rate for the energy used, provided the demand does not exceed a predetermined amount. If the demand at any time exceeds this predetermined amount, the consumer is penalized; the amount of the penalty depending upon the magnitude of the greatest or maximum demand made by the consumer's installation. This method requires for its successful operation an apparatus which will accurately record the greatest or maximum demand made by the consumer's installation.

The object of penalizing the consumer when the demand of his installation exceeds a predetermined amount is usually to induce him to maintain his normal energy consumption or normal demand below this predetermined amount. It is not proposed to penalize the consumer for temporary overloads or for the effects of heavy overloads, such as short circuits. Accordingly it is always desirable in determining the maximum demand to employ as a unit of reference a period or interval which will be just and reasonable to both the consumer and the central station. Furthermore, the inherent principle of operation of the demand apparatus should ordinarily be such that error, if any, in the indications will be in the consumer's favor and not prejudicial to him.

The primary object of my invention is to provide a demand apparatus having the above mentioned characteristics. That is, I aim to provide a novel construction of apparatus for measuring demand, and particularly maximum demand, which employs a suitable and reasonable unit of reference, and in which error, if any, is resolved by the inherent principle of operation of the apparatus in favor of the consumer.

In carrying out my invention I take as the unit of reference a predetermined quantity or interval of metered energy. The time in which a predetermined quantity of energy is consumed and metered gives an indication of the demand during the metering of this quantity of energy and the minimum time in which any one of a number of equal quantities of energy is metered will obviously correspond to the maximum demand. I have employed the expression interval of metered energy to designate a predetermined quantity of energy consumed and metered.

My invention then consists in measuring the time in which equal quantities or intervals of energy are metered and indicating the minimum time so measured.

In measuring and indicating the maximum demand it is often desirable that the movement of the indicating element be directly indicative of the demand, so that the maximum demand will be represented by the maximum movement of the element. When the maximum demand is measured in terms of the times required to consume predetermined and equal quantities of energy, the times vary inversely as the demands, and the provision of an apparatus having an indicating element whose movement, with reference to the graduations on a scale, is directly indicative of the demand becomes a problem of considerable complexity.

An additional object of my invention is, therefore, to provide a method of and means for obtaining an indicating action directly proportional to a variable quantity where the variable quantity is measured in a unit which gives a measurement varying in magnitude inversely as the magnitude of the quantity. In accomplishing this object of my invention, I measure the variable quantity in a unit which gives a measurement varying inversely in magnitude as the magnitude of the quantity, and produce an action inversely proportional to the magnitude of the measurement. The action so produced thus gives an indication proportional to the variable quantity.

As applied to a maximum demand apparatus, my method consists in producing an action inversely proportional to the time in which each of a number of equal quantities or intervals of electrical energy is metered and in obtaining an indication of the action of maximum magnitude so produced. It is desirable in most instances to indicate the demand in units of energy as well as time.

A further object of my invention is accordingly to provide a novel form of scale to be used with demand apparatus for indicating the average rate of consumption of energy during the time a predetermined quantity of energy is consumed and metered. For this purpose I preferably provide a scale having graduations to indicate time and coöperating graduations to indicate the average rate of consumption of energy.

The novel and patentable features which I believe to be characteristic of my invention are indicated in the claims appended hereto.

The construction and mode of operation of a maximum demand apparatus embodying my invention will be understood by reference to the following description taken in connection with the accompanying drawings, in which:—

Figure 1 is a diagrammatic view in perspective of my novel and improved type of maximum demand apparatus operatively connected to an electrical installation; Fig. 2 is a view of my novel form of scale with two forms of indicating devices; and Figs. 3, 4 and 5 are detailed views of a particular feature of construction of the apparatus at different instances in the cycle of operations.

Referring to Fig. 1 of the drawings there is shown a substantially constant speed driving mechanism 6. While I have shown a clockwork mechanism as the substantial constant speed driving means, it will be understood that any other suitable form of driving means, such as a constant speed electric motor, may be employed. The driving mechanism 6 is arranged to rotate a shaft 7 in a clockwise direction by means of a pawl 8 driven directly by the mechanism and a ratchet wheel 9 rigidly secured to the shaft 7.

A cam 10 is mounted on the shaft 7 and is normally adapted to be turned in a clockwise direction by the shaft. The operative connection between the shaft and the cam is made through a spring plate 11, so that if the cam is for any reason held fixed the shaft 7 may be revolved. This flexible connection between the shaft 7 and the cam 10 is a necessary feature for the successful operation of the apparatus.

A movable element 12 is loosely mounted on a pivoted shaft 13. A fixed stop 14 limits the movement of the element 12 in one direction and determines its initial or zero position. A finger 35 is rigidly secured to the shaft 13 and is arranged to contact with a pin 37 on the element 12. A coil spring 36 has one end secured to the shaft 13 and the other end secured to the pin 37, and acts to hold the finger and pin in contact. The spring is so arranged that its tension is increased when the pin and finger are separated. An arm 15 is secured to the element 12 and is positioned to engage with some point on the periphery of the cam 10 when the element 12 is moved in a clockwise direction.

The engagement of the arm 15 with the periphery of the cam 10 limits the extent of movement of the element 12 in a clockwise direction. The periphery of the cam 10 is so designed that the extent of movement of the element 12 in a clockwise direction is a function of the angle through which the cam is moved from its initial position. The means for determining the initial position of the cam will be described more fully hereinafter.

A lever 16 is fulcrumed about a fixed pin 17 and is operatively connected to the armature or plunger 18 of a solenoid 19. The lever is provided with a counter weight 20 which normally holds the armature in an elevated position. A link 21 operatively connects the lever 16 to a second lever 22 pivoted on a pin 23. The lever 22 is provided with two curved arms 24 and 25. The arm 24 is pivoted to a crank arm 26 rigidly secured to the shaft 13. Two suitably spaced pins 27 and 28 are secured to the curved arm 25.

A gear 29 is loosely mounted on the shaft 13 and operatively engages with a pinion 30 rigidly secured to the shaft 7. A ratchet wheel 31 is secured to the gear 29 and coöperates with a pawl 32 secured to a crank arm 33 loosely mounted on the shaft 13. An arm 34 is secured to or integral with the crank arm 33 and is arranged to engage with either the pin 27 or the pin 28. Under normal conditions when the armature 18 is elevated, the arm 34 engages with the pin 28.

In Fig. 1 of the drawings I have shown my novel form of demand instrument in combination with an induction meter. It will, of course, be understood that my invention is in no sense limited to this particular form of meter, but is adapted to be used in combination with any electric meter of the motor type. The induction meter shown in the drawings is of the usual and well known type and comprises a rotatable disk armature 38 located within the influence of a rotating field produced by the interaction of a series coil 39 and potential coils 40. These coils are properly connected to a main line circuit 41, supplying current to translating devices 42. A shaft 43 is secured to the disk armature 38 and drives, through gearing 44, the usual registering mechanism of the meter which is not shown in the drawings. The shaft 43 also drives a dog 45, which latter in turn drives a gear 46 by means of a pinion 47 and crank arm 48. Rigidly secured to the gear 46 is a metallic contact disk 49 which has a contact finger 50 of a predetermined width. A fixed flexible contact member 51 is operatively positioned in the path of the contact finger 50.

When the contact finger 50 engages with the coöperating fixed contact member 51, an electric circuit is completed through the winding of the solenoid 19. For this purpose one terminal of the winding of the solenoid is connected by conductor 52 to one side of the line circuit 41 and the contact disk 49 is connected by conductor 53 to the other side of the circuit 41, while contact member 51 is connected by conductor 54 to the other terminal of the winding of the solenoid.

The remaining features of the construction of my maximum demand apparatus will be best understood from a description of the operation of the same. The solenoid 19 is designed to be energized at the end of equal intervals of metered energy, that is, each time that the meter shaft 43 makes a predetermined number of revolutions. Fig. 1 represents the position of the various elements of the apparatus a short time after the beginning of the metering of an interval. The contact finger 50 has moved a slight distance in a clockwise direction from the fixed contact member 51 and the cam 10 has been revolved through a small angle from its initial position.

The cam 10 is revolved at substantially constant speed by the engagement of the pawl 8 with the ratchet 9. It will be observed that this connection between the driving mechanism 6 and the shaft 7 prevents the rotation of the shaft in a counter clockwise direction, but permits a rotation of the shaft in a clockwise direction at an angular velocity greater than the angular velocity of the pawl 8. The cam illustrated in the drawings is so designed that the distance through which the element 12 moves before the rod 15 engages with the periphery of the cam is inversely proportional to the angle through which the cam has turned from its initial position. The distance from the rod 15 to the periphery of the cam 10 is thus inversely proportional to the length of time the cam has been rotating since starting from its initial position.

When the predetermined quantity of energy has been metered, the contact finger 50 engages the contact member 51, the solenoid 19 is energized and its armature 18 is pulled down. The downward movement of the armature 18 turns the lever 16 about its fulcrum 17, and, through the coöperation of the link 21, the movable end of the lever 22 is also moved downwardly about its fulcrum 23. The downward movement of the lever 22 turns the crank arm 26 through a small angle in a clockwise direction. The shaft 13 and the finger 35 are moved through a similar angle by the movement of the arm 26. The tension of the spring 36 causes the movable element 12 to turn with the finger 35 in a clockwise direction and until the arm 15 engages with the periphery of the cam 10. The relative positions of the cam 10 and the arm 15 at this instant are shown in Fig. 4 of the drawings.

A non-return indicating pointer 55 is arranged to be actuated by the arm 15 and will remain in any position to which it is moved by the arm 15, due to a spring plate 56 which provides a frictional engagement of the pointer 55 on its shaft 57. The pointer 55 moves across a stationary scale or record sheet 61 which is shown in greater detail in Fig. 2.

The angle through which the crank arm 26 is moved is sufficient to always bring the arm 15 into engagement with the periphery of the cam before the pin 27, which moves downwardly with the lever 22, engages the arm 34. When the pin 27 engages the arm 34, the arm 15 has moved into engagement with the periphery of the cam 10 and is contacting therewith. The continued downward movement of the lever 22 causes the pin 27 to turn the arm 34 in a counter clockwise direction. As the arm 34 is thus moved, the crank arm 33 carrying the pawl 32 is similarly moved and the gear 29 is turned through a certain angle in a counter clockwise direction. The movement of the gear 29 is transmitted through the pinion 30 to the shaft 7, and since the rotation of the shaft thus produced is much more rapid than the rotation of the pawl 8, the shaft 7 and the cam 10 will turn in a clockwise direction with the pawl 8 slipping over the ratchet 9.

As the cam 10 moves in a clockwise direction its periphery pushes the rod 15 and the movable element 12 in a counter clockwise direction and toward the initial position of the element. An arm 58 is secured to the lever 16 and moves in a clockwise direction when the armature 18 is drawn downwardly. The arm 58 carries a stop 59 which is adapted to occupy a position in the path of a pin 60, secured to the cam 10, when the armature 18 is in its lowered position. When the solenoid is energized, the stop 59 is accordingly moved by the armature 18 into a position where it will arrest the cam 10. As the cam is turned by the gear 29 and the pinion 30, the pin 60 engages with the stop 59, and the initial or zero position of the cam is thus determined. The shaft 7 is free to complete its angle of rotation due to the flexible connection between the shaft and the cam. The position of the cam in its initial position with the stop 59 engaging the pin 60 is shown in Fig. 5 of the drawings.

When the contact finger 50 moves out of engagement with the contact member 51, the solenoid 19 is deënergized and the armature 18 is raised by means of the counter weight 20. The shaft 13 is thereby turned in a counter clockwise direction through the coöperation of the lever 22 and the crank arm 26 until it occupies its initial or normal position. The pin 28 moves up and contacts with the arm 34. The finger 35 engages with the pin 37 on the movable element 12 and completes the return of this element to its initial position. The movement of the lever 16 upwardly moves the arm 58 in a counter clockwise direction and stop 59 is withdrawn from engagement with the pin 60. The entire apparatus has now been restored to its initial or starting position and this cycle of operations is repeated during each predetermined equal interval of metered energy.

The first effect of the rotation of the shaft 13 is to move the arm 15 into engagement with the periphery of the cam. The spring connection between the shaft 13 and the movable element 12 permits the shaft to turn without producing a corresponding movement of the element. When the arm 15 contacts with the cam further movement of the element 12 is prevented. At the same time the shaft 13 is free to turn, and in turning will move finger 35 from engagement with pin 37 and will thus increase the tension of spring 36. The cam does not start to move to its initial position until the arm 15 has reached the periphery of the cam, and to this end the movement given the arm is always sufficient to effect this engagement before the pin 27 engages the arm 34. The second effect of the rotation of the shaft 13 is to complete the revolution of the cam and to bring the elements into their respective initial positions. The gear 29 is so proportioned that the slight angular movement given it by the pawl 32 is sufficient to turn the pinion 30 through one complete revolution, and thus the cam is always turned through one complete revolution during each interval of metered energy.

The contact finger 50 is of such a width that the finger and contact member 51 are in engagement for an appreciable length of time, that is, for several seconds. The armature 18 of the solenoid is operatively connected to a dash pot 62 so that the downward movement of the armature is gradual. The width of the contact finger 50 and the characteristics of the dash pot 62 may thus be so designed and proportioned that the clockwise movement of the element 12 is even and gradual. Such movement is necessary in order to prevent an erroneous indication by the non-return pointer 55 which is likely to result if the arm 15 is moved too rapidly.

I may use in conjunction with or in place of the non-return pointer an indicating pointer which leaves a mark on the scale showing the extent it has been moved. Such a pointer is shown in Fig. 2 of the drawings. In this figure, the pointer 63 is provided with a piece of marking material 64 which is adapted to engage with the scale or record sheet 61. As the pointer moves over the scale it draws a line 65 which indicates the maximum distance the pointer 63 has moved. The pointer 63 is preferably secured to the arm 15 and thus moves with the movable element 12. In Fig. 2 I have shown the non-return pointer 55′ provided with a pin 66 in the path of the pointer 63. In this case the pointer 55′ and the line or mark 65 both indicate the maximum demand. It will be obvious that I can use either the non-return pointer alone or the marking pointer alone. If the marking pointer is used alone the friction between the record sheet 61 and the marking material 64 may be made sufficient to insure a gradual movement of the pointer. In this case the dash pot may be dispensed with and the width of the contact finger 50 considerably lessened.

If the substantially constant speed driving mechanism 6 should stop, it is evident that the cam 10 will cease to rotate. If this should happen soon after the beginning of the new interval of metered energy, it is obvious that an erroneous indication might be obtained. If the meter reader, therefore, finds the mechanism 6 stopped, the indication recorded should be disregarded if the consumer is to be given the benefit of the doubt. If the meter should stop, the cam 10 will continue to rotate in a clockwise direction. If the cam completes one revolution before the predetermined interval of energy has been metered, the pin 60 will engage with a stop 67 on the arm 58. This will be apparent by reference to Fig. 3. In this figure, the parts are represented in their normal and initial positions. When the cam 10 has made nearly one complete revolution, the pin 60 will be directly beneath the stop 67. Further rotation of the cam is then prevented by the engagement of the pin with the stop, but the shaft 7 continues to rotate due to the flexible connection between the shaft and the cam. When the predetermined interval of energy has been metered, the solenoid 19 is energized and the apparatus goes through the hereinbefore described cycle of operations.

It will be obvious by reference to Fig. 3 that the movement of the arm 15 will be very small if the pin 60 is engaged by the stop 67. The pointer 55 or 63, as the case may be, will therefore, move no appreciable distance. When the solenoid is energized, the arm 58 is moved as previously described, and the stop 67 moves from engagement with the pin 60, while stop 59 moves into position to engage with the stop 60 when the complete revolution of the cam is completed by the gear 29 and the pinion 30. This position is represented in Fig. 5 of the drawings. When contact finger 50 moves out of engagement with contact member 51, the arm 58 returns to its initial position and the cam is correctly positioned to again commence the cycle of operation, as indicated in Fig. 3 of the drawings.

My demand indicator primarily measures the time in which a predetermined interval of energy is metered. This is often an undesirable unit in which to express the demand, and I have accordingly devised a novel type of scale. Preferably this scale is provided with two sets of graduations. In the form of scale illustrated in the drawings one set of graduations 68 are equally spaced and are designed to indicate units of time. Adjacent to and coöperating with graduations 68 are graduations 69 which are designed to directly indicate the average rate of consumption of energy during the time in which the predetermined quantity of energy is metered. The average rate of consumption of energy is indicated by ascending graduations reading from left to right, and time is indicated by descending graduations reading from left to right. In the instrument illustrated, the predetermined interval of metered energy is 150 watt hours. If this quantity of energy is metered in 60 minutes, the average rate of consumption of energy is 150 watts. If, however, this interval of energy is metered in 15 minutes, the average rate of consumption of energy is 600 watts. This form of scale is decidedly advantageous, since it provides a direct indication of the average rate of consumption of energy during a predetermined interval. It will, of course, be obvious that where only the average rate of consumption of energy during a predetermined interval is desired the graduations of time 68 may be omitted.

For the purpose of a maximum demand indicator, I have illustrated a cam 10 which determines the extent of movement of the element 12 inversely as the magnitude of the angle through which the cam has moved from its initial position. It is evident that the cam may be given other configurations to meet certain desired conditions of service, and that the distance through which the element 12 is permitted to move may be another function of the time or some function of another quantity. For example, the cam may be so shaped that the movement of the movable element is directly proportional to the average rate of consumption of energy during the time the predetermined quantity of energy is metered, and thus the graduations indicating average rate of consumption of energy will be equally spaced.

One of the particular advantages of my maximum demand apparatus is that it employs as a unit of reference a predetermined interval of metered energy. Any error occasioned by the failure of the apparatus to operate is inherently resolved in favor of the consumer. It will be observed that if the apparatus fails to operate at the end of an equal interval of metered energy the cam 10 will continue to rotate, and thus when the apparatus does operate, probably at the end of the next interval of metered energy, a longer length of time for the consumption of the energy interval, or a lower average rate of energy consumption, will be indicated. In no case will a failure of the instrument to operate at the end of an energy interval give an indication of a demand which is prejudicial to the consumer.

I have described and illustrated herein the best embodiment now known to me of my invention. It will be apparent to those skilled in the art that various changes and modifications may be made in this demand apparatus without departing from the spirit of my invention. I have accordingly aimed in the appended claims to cover all modifications which are within the scope of my invention.

What I claim as new and desire to secure by Letters Patent of the United States, is,—

1. The method of indicating the minimum time in which any one of a number of equal quantities of electrical energy is consumed which consists in producing an action inversely proportional to the time in which each equal quantity of energy is consumed, and obtaining an indication of the action of maximum magnitude so produced.

2. The method of indicating the maximum demand of an electrical installation which consists in producing an action inversely proportional to the time in which each of a number of equal quantities of electrical energy is consumed, and obtaining an indication of the action of maximum magnitude so produced.

3. An apparatus for indicating the demand of an electrical installation comprising a movable member, means for producing a movement of said member indicative of the time required to consume a predetermined quantity of electrical energy, and means for indicating the maximum movement of said member during any one of a number of its movements in response to the last mentioned means.

4. An apparatus for indicating the maximum demand of an electrical installation comprising a movable member, means for moving said member a distance inversely proportional to the time in which a predetermined quantity of electrical energy is consumed, and means for indicating the maximum movement of said member during any one of a number of its movement in response to the last mentioned means.

5. An apparatus for indicating the demand of an electrical installation comprising a movable member, means for producing a movement of said member indicative of the time required to consume a predetermined quantity of electrical energy, and means operatively related to said member and adapted to indicate the extent of movement of the member.

6. A demand apparatus comprising in combination an electric meter, a movable element, means for moving said element a distance which is a function of the time in which a predetermined quantity of energy is metered, and means coöperating with said element for directly indicating the average rate of consumption of energy during said time.

7. A demand apparatus comprising in combination an electric meter, a movable element, means for moving said element a distance which is a function of the time in which a predetermined quantity of energy is metered, and means coöperating with said element for indicating the time in which said quantity of energy is metered.

8. A demand apparatus comprising in combination an electric meter, a movable element, means for moving said element a distance which is a function of the time in which a predetermined quantity of electrical energy is metered, and means for indicating by the position of said element the average rate of consumption of energy during said time.

9. A demand apparatus comprising in combination an electric meter, a movable element, means for moving said element a distance which is a function of the time in which a predetermined quantity of electrical energy is metered and for returning said element to an initial position after said quantity of energy is metered, and means for causing said element to leave an indication of the minimum time in which any one of a number of equal quantities of energy each equal to said predetermined quantity is metered.

10. A demand apparatus comprising in combination an electric meter, a movable element, means for moving said element a distance which is a function of the time in which a predetermined quantity of energy is metered, and means coöperating with said element for obtaining an indication of the minimum time in which any one of a number of equal quantities of energy each equal to said predetermined quantity is metered.

11. A demand apparatus comprising in combination an electric meter, a movable element, means for moving said element a distance which is a function of the time in which a predetermined interval of energy is metered, and means coöperating with said element for indicating the maximum average rate of consumption of energy during any one of a number of intervals of energy each equal to said predetermined interval.

12. A demand apparatus comprising in combination an electric meter, a movable element, means for producing a movement of said element inversely proportional to the time in which a predetermined quantity of electrical energy is metered, and means coöperating with said element for indicating the average rate of consumption of energy during said time.

13. A demand apparatus comprising in combination an electric meter, a scale having graduations to indicate the average rate of consumption of energy during the time a predetermined quantity of energy is metered, a movable element arranged to sweep across said scale, and means for moving said element a distance indicative of the average rate of consumption of energy during said time.

14. A demand apparatus comprising in combination an electric meter, a movable element, means for producing a movement of said element inversely proportional to the time in which a predetermined quantity of electrical energy is metered, and means in operative relation with said element for indicating the time in which said quantity of energy is metered.

15. A demand apparatus comprising in combination an electric meter, a movable element having an initial position, means for producing a movement of said element inversely proportional to the time in which a predetermined quantity of electrical energy is metered and for then returning the element to its initial position, means in operative relation with said element for indicating the time in which said quantity of energy is metered, and means for indicating the maximum movement of said element produced during the metering of a number of equal quantities of energy each quantity equal to said predetermined quantity.

16. A demand apparatus comprising in combination an electric meter, a movable element having an initial position, and means controlled by said meter and actuated at equal intervals of metered energy for moving said element a distance indicative of the average rate of consumption of energy during the interval and for then returning the element to its initial position.

17. A demand apparatus comprising in combination an electric meter, a movable element having an initial position, means controlled by said meter and actuated at equal intervals of metered energy for moving said element a distance indicative of the average rate of consumption of energy during the interval and for then returning the element to its initial position, and means for indicating the maximum movement of said element.

18. A demand apparatus comprising in combination an electric meter, a movable element having an initial position, and means for producing a movement of said element indicative of the average rate of consumption of energy during a predetermined interval of metered energy and for returning said element to its initial position after such movement has been produced.

19. A demand apparatus comprising in combination an electric meter, a movable element having an initial position, means for producing a movement of said element indicative of the average rate of consumption of energy during a predetermined interval of metered energy and for returning said element to its initial position after such movement has been produced, and means coöperating with said element for indicating the maximum rate of consumption of energy during any one of a number of intervals of energy each equal to said predetermined interval.

20. A demand apparatus comprising in combination an electric meter, a movable element, a time actuated cam arranged to limit the movement of said element in one direction, means controlled by said meter and actuated at equal intervals of metered energy for moving said element into engagement with said cam and for returning the cam and the element to their respective initial positions, and means coöperating with said element for indicating the minimum time in which any one of the equal intervals of energy is metered.

21. A demand apparatus comprising in combination an electric meter, a movable element having an initial position, a time actuated cam having an initial position and arranged to determine the extent of movement of said element in one direction as a function of the angle through which the cam has moved from its initial position, and means controlled by said meter and actuated at equal intervals of metered energy for moving said element into engagement with said cam and for returning the cam and the element to their respective initial positions.

22. A demand apparatus comprising in combination an electric meter, a movable element having an initial position, a time actuated cam having an initial position and arranged to determine the extent of movement of said element in one direction inversely as the magnitude of the angle through which the cam has moved from its initial position, and means controlled by said meter and actuated at equal intervals of metered energy for moving said element into engagement with said cam and for returning the cam and the element to their respective initial positions.

23. A demand apparatus comprising in combination an electric meter, a movable element having an initial position, a time actuated cam having an initial position and arranged to determine the extent of movement of said element in one direction as the function of the angle through which the cam has moved from its initial position, means controlled by said meter and actuated at equal intervals of metered energy for moving said element into engagement with said cam and for returning the element and the cam to their respective initial positions, and means for indicating the maximum movement of said element.

24. A demand apparatus comprising in combination an electric meter, a movable element having an initial position, a time actuated cam having an initial position and arranged to determine the extent of movement of said element in one direction inversely as the magnitude of the angle through which the cam has moved from its initial position, means controlled by said meter and actuated at equal intervals of metered energy for moving said element into engagement with said cam and for returning the cam and the element to their respective initial positions, and means for indicating the maximum movement of said element.

In witness whereof, I have hereunto set my hand this 17th day of March, 1913.

LEWIS T. ROBINSON.

Witnesses:
HELEN ORFORD,
BENJAMIN B. HULL.